United States Patent [19]

Watabe et al.

[11] Patent Number: 5,315,335
[45] Date of Patent: May 24, 1994

[54] BRAKE DEVICE FOR FOCAL PLANE SHUTTER

[75] Inventors: Ken-ichi Watabe; Nobuyoshi Inoue, both of Tokyo, Japan

[73] Assignee: Copal Company Limited, Tokyo, Japan

[21] Appl. No.: 922,131

[22] Filed: Jul. 30, 1992

[30] Foreign Application Priority Data

Aug. 2, 1991 [JP] Japan .................................. 3-194330

[51] Int. Cl.$^5$ .............................................. G03B 9/40
[52] U.S. Cl. ................................................... 354/252
[58] Field of Search ................................ 354/245–249, 354/252

[56] References Cited

U.S. PATENT DOCUMENTS 4,829,329  5/1989  Toyoda et al. ..................... 354/252
4,975,722 12/1990  Suzuki et al. ...................... 354/246

FOREIGN PATENT DOCUMENTS 56-88227  7/1981  Japan .
58-196527 11/1983  Japan .
59-210424 11/1984  Japan .
60-68523  5/1985  Japan .

Primary Examiner—Michael L. Gellner
Assistant Examiner—J. K. Han
Attorney, Agent, or Firm—Graham & James

[57] ABSTRACT

A focal plane shutter comprising a front blade braking lever functioning to press a front blade actuating lever to a rotating shaft thereof by utilizing resilience of a front blade actuating spring at a final stage of an exposure operation performed by the front blade actuating lever and a rear blade braking lever functioning to press a rear blade actuating lever to a rotating shaft thereof by utilizing resilience of a rear blade actuating spring at a final stage of an exposure operation performed by the rear blade actuating lever. This focal plane shutter is simple in structure thereof, capable of controlling exposure of film with high accuracy and maintaining initial performance thereof for a long term, and can be manufactured at a low cost.

3 Claims, 2 Drawing Sheets

BRAKE DEVICE FOR FOCAL PLANE SHUTTER

BACKGROUND OF THE INVENTION a) Field of the invention:

The present invention relates to a shutter for cameras, and more particularly a braking means which is suited for use with focal plane shutters.

b) Description of the prior art:

Certain shutters for cameras are equipped with braking means which serve for preventing shutter blades and shutter blade actuating members from rebounding at the time of opening or closing operations of the shutter blades. An ordinary type of the braking means for focal plane shutters adopts a brake lever utilizing frictional plates and is configured so as to exert a braking force to the shutter blade actuating member by bringing the shutter blade actuating member into contact with the brake lever at a final stage of a movement of the shutter blade actuating member (Japanese Utility Model Preliminary Publication No. Sho. 60-68523). Further, another type of the braking means for focal plane shutters comprises an elastic member disposed in a final region of a moving course for the shutter blade actuating member and is configured so as to exert a braking force to the actuating member by bringing the actuating member into contact with the elastic member at the final stage of the movement of the actuating member (Japanese Utility Model Preliminary Publication No. Sho 56-88227). Furthermore, still another type of the braking means for focal plane shutters adopts, in place of the elastic member described above, a horseshoe-shaped member made of an elastic material and is configured so as to exert a braking force to the shutter blade actuating member by fitting or receiving a pin formed integrally with the shutter blade actuating member into or with the horseshoe-shaped member at the final stage of the movement of the shutter blade actuating member (Japanese Patent Preliminary Publication No. Sho 59-210424). The braking means of the types described above pose a common problem that these braking means require stronger forces for moving the shutter blade actuating members in the reverse direction to cock the shutters as these means exert stronger braking forces. Moreover, these braking means pose another problem that these means allow the braking forces to be weakened and/or made unstable after long-term use due to abrasion of the frictional plates and the elastic members. In addition, the braking means of the types described above have a common defect that costs required for manufacturing focal plane shutters are increased by these braking means.

There is additionally known a different type of braking means which is configured so as to exert a biasing force to the braking lever by utilizing a coil spring. This braking means is constructed so as to allow a restoring force of the coil spring to be exerted to the shutter blade actuating member when the brake lever is pushed by the actuating member at the final stage of the movement of the shutter blade actuating member. As a braking means of a type which is similar to the braking means disclosed by the Japanese patent mentioned above, there is also known a braking means which is configured so as to allow the restoring force of the coil spring to be exerted directly to the shutter blade actuating member. Unlike the braking means which utilize the frictional plates or the elastic members, the braking means of the last two types are capable of maintaining stable operations even after long-term use, but apt to allow high-speed rebounds of the shutter blade actuating members and the shutter blades at the stopping time thereof, and therefore require lock levers for preventing the rebounds of the actuating members and the shutter blades. Accordingly, each of these two types of braking means requires a mechanism which is to be used for releasing the lock lever before cocking a shutter and has a defect the braking means is inevitably complicated in the structure thereof. Further, the braking means utilizing the coil springs has another defect that these means can hardly control a timing for locking the shutter blade actuating members by using the lock lever since the timing is variable dependently on lapse of time and variations of ambient conditions such as temperature.

SUMMARY OF THE INVENTION

In view of the problems described above, it is a primary object of the present invention to provide a braking means which is to be used with focal plane shutters for cameras, has a relatively simple structure and is capable of accurately controlling operations of shutter blade actuating members.

It is another object of the present invention to provide a braking means which is to be used with focal plane shutters for cameras, capable of stably maintaining initial performance thereof even after long-term use and can be manufactured at relatively low cost.

According to the present invention, these objects are attained by configuring a braking means so that it comprises a braking member which has an arm to be brought into contact and pushed with and by a shutter blade actuating member when this member is rotated for exposure of a film as well as another arm to be engaged with a driving power source for disengaging the driving power source from the shutter blade actuating member at a final stage of a rotating motion of the actuating member, and so that a force produced by the driving power source is exerted to a rotating shaft of the shutter blade actuating member by way of the braking member when the driving power source is disengaged from the actuating member.

In a preferable formation of the braking means according to the present invention, the driving power source is a coil spring which is wound around the rotating shaft of the shutter blade actuating member, and has an end detachably connected to a fixed pin and the other end detachably connected to a shutter blade actuating member.

According to the the present invention, the shutter blade actuating means continues the rotating motion thereof only under inertia at the final stage of the rotating motion for exposure of the film and the driving power source functions as a braking force source for the shutter blade actuating member exerting a braking force by way of the braking member. Consequently, the shutter blade actuating member can stop without rebound in a final region of the rotational course thereof.

These and other objects as well as the features and the advantages of the present invention will become apparent from the following detailed description of the preferred embodiment when taken in conjunction with the accompanying drawings.

DESCRIPTION OF THE PREFERRED EMBODIMENT

Figure 1:
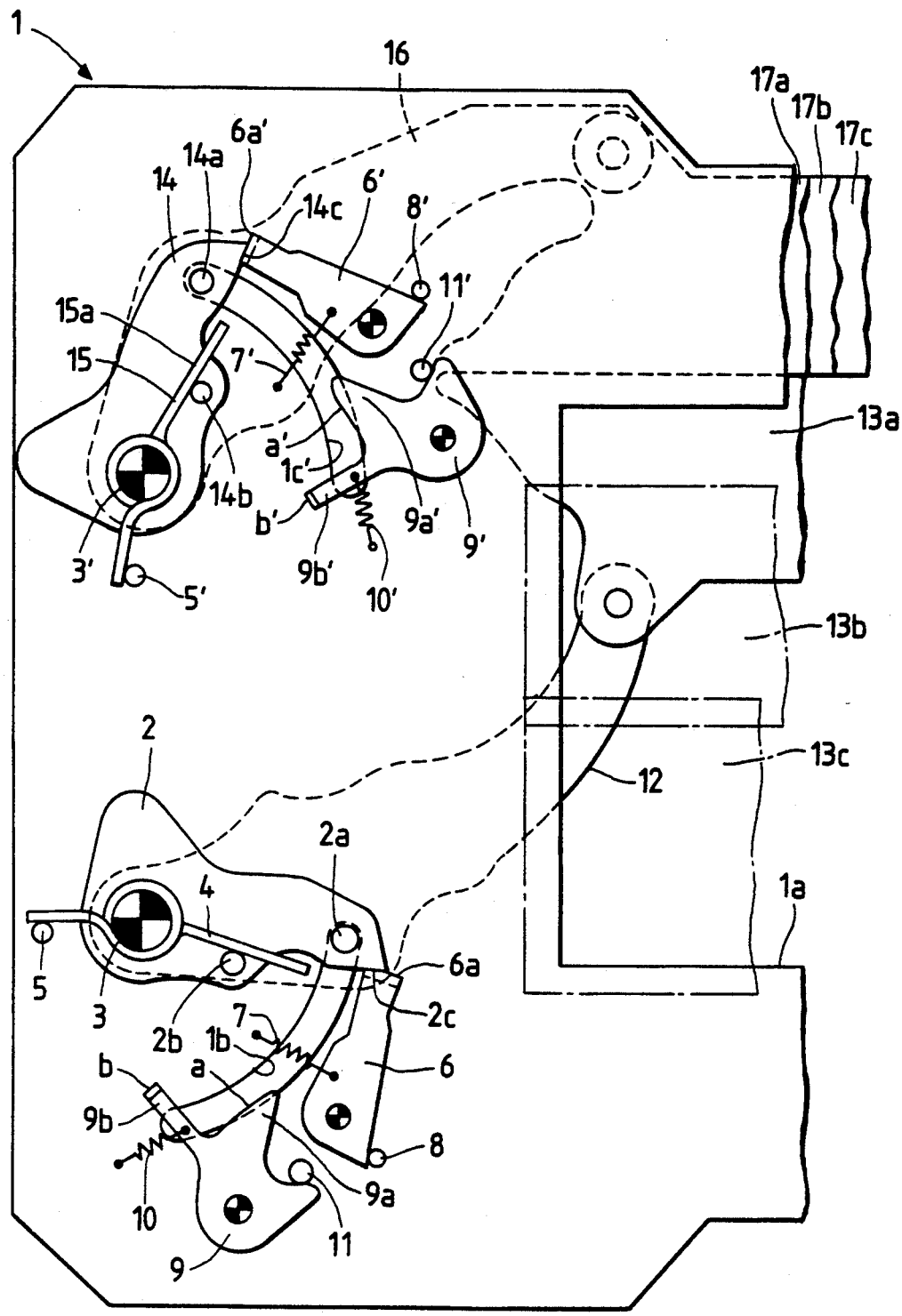
FIG. 1 is a plan view illustrating main members of a focal plane shutter, set in a cocked state thereof, to which the braking means according to the present invention is to apply.

In FIG. 1, the reference numeral 1 represents a shutter base plate which has an exposure aperture 1a and a pair of arc-shaped slots 1b, 1c formed therein, the reference numeral 2 designates a front blade actuating lever which is pivoted on the base plate 1 by a shaft 3, and has an actuating pin 2a fitted in the slot 1b and a pin 2b, the reference numeral 4 denotes a front blade actuating spring which is wound around the shaft 3, has an end engaged with the pin 2b and the other end engaged with a pin 5 fixed on the base plate 1, and functions to urge the actuating lever 2 clockwise, the reference numeral 6 represents a lock lever which is pivoted on the base plate 1 and has a bent end 6a engaged with a tip 2c of the actuating lever 2, the reference numeral 7 designates a spring which urges the lock lever 6 counterclockwise, the reference numeral 8 denotes a stopper for limiting counterclockwise rotation of the lock lever 6, the reference numeral 9 represents a brake lever which is pivoted on the base plate 1, and has a first arm 9a having a cam surface a to be brought into contact with the pin 2a of the actuating lever 2 and a second arm 9b having a bent end b to be engaged with an arm end of the actuating spring 4, the reference numeral 10 denotes a spring for urging the brake lever 9 counterclockwise, the reference numeral 11 represents a stopper for limiting counterclockwise rotation of the brake lever 9, the reference numeral 12 designates a front blade supporting arm which is pivoted on a rear surface of the base plate 1 by the shaft 3 and connected integrally with the actuating lever 2 by the actuating pin 2a, and the reference numeral 13a denotes a front blade for forming a slit which is pivoted to the supporting arm 12. The front blade 13a, together with a plurality of other blades 13b, 13c (schematically shown in chain lines) which are pivoted to the front blade supporting arm 12 in a well-known manner, composes a front blade group and is disposed so as to be capable of opening and closing the exposure aperture 1a by travelling between an unfolded position shown in FIG. 1 and a folded position which is not shown.

The lock lever 6 can be rotated clockwise against resilience of the spring by an actuator (not shown) which is adopted for controlling exposure time. The first arm 9a and the second arm 9b of the brake lever 9 are configured so as to form a rough shape of "L". When the front blade actuating arm 2 is rotated clockwise from the position shown in FIG. 1 upon releasing a shutter, the actuating pin 2a is brought into contact with the first arm 9a to rotate the brake lever 9 clockwise, whereby the front blade group is gradually folded from the positions shown in FIG. 1, until the exposure aperture 1a is fully opened and an arm 4a of the actuating spring 4 is brought into contact with the bent end b of the second arm 9b.

Description has been made above mainly of a mechanism for actuating the front blades. Now, description will be made below of another mechanism for actuating rear blades. The rear blade actuating mechanism has a composition which is fundamentally the same as that of the front blade actuating mechanism. Members and parts of the rear blade actuating mechanism which have the same functions as those of the members and parts of the front blade actuating mechanism will be represented by the same reference numerals with dashes and not described in particular. In FIG. 1, the reference numeral 14 represents a rear blade actuating lever which is pivoted to the shutter base plate 1 by a shaft 3', and has an actuating pin 14a fitted in a slot 1c and another pin 14b, the reference numeral 15 designates a rear blade actuating spring which is wound around the shaft 3', has an end engaged with a pin 14b and the other end engaged with a fixed pin 5', and serves for urging the actuating lever 14 in the clockwise direction, the reference numeral 16 denotes a rear blade supporting arm which is pivoted to on the rear surface of the base plate 1 by the shaft 3' and connected integrally with the actuating lever 14 by the actuating pin 14a, and the reference numeral 17a represents a rear blade for forming a slit which is pivoted to the supporting arm 16 and composes, together with a plurality of other blades 17b, 17c which are pivoted to the rear blade supporting arm 16 in a well-known manner (not shown), a rear blade group. The rear blades 17a, 17b and 17c are capable of opening and closing the exposure aperture 1a by travelling between folded positions (positions to cover the exposure aperture 1a) which are shown in FIG. 1 and unfolded positions which are not shown. When the rear blade actuating arm 14 is rotated clockwise from the position shown in FIG. 1 so as to terminate exposure of a film, the actuating pin 14a is brought into contact with the first arm 9a' to rotate the brake lever 9' clockwise, whereby the rear blades are gradually unfolded from the folded positions shown in FIG. 1, until the exposure aperture 1a is closed and an arm 15a of the actuating spring 15 is brought into contact with a bent end b' of a second arm 9b'.

Now, operations of the focal plane shutter according to the present invention will be described below.

Illustrated in FIG. 1 is the focal plane shutter in a cocked state thereof. When the shutter is released in this state, the lock lever 6 is first rotated clockwise by an actuator (not shown) for freeing the front blade actuating lever 2. Accordingly, the front blade actuating lever 2 and the front blade supporting lever 12 rotate clockwise as an integral unit, and the front blades 13a, 13b, 13c go down while being folded, thereby opening the exposure aperture 1a. The exposure of the film is started in this way. Upon lapse of an adequate exposure time, the lock lever 6' is rotated clockwise by the actuator (not shown) for freeing the rear blade actuating lever 14. Consequently, the rear blade actuating lever 14 and the rear blade supporting lever 16 rotate clockwise as an integral unit, and the rear blades 17a, 17b, 17c go down while being unfolded, thereby closing the exposure aperture 1a. Thus, a single operation for the exposure of the film is terminated.

Figure 2:
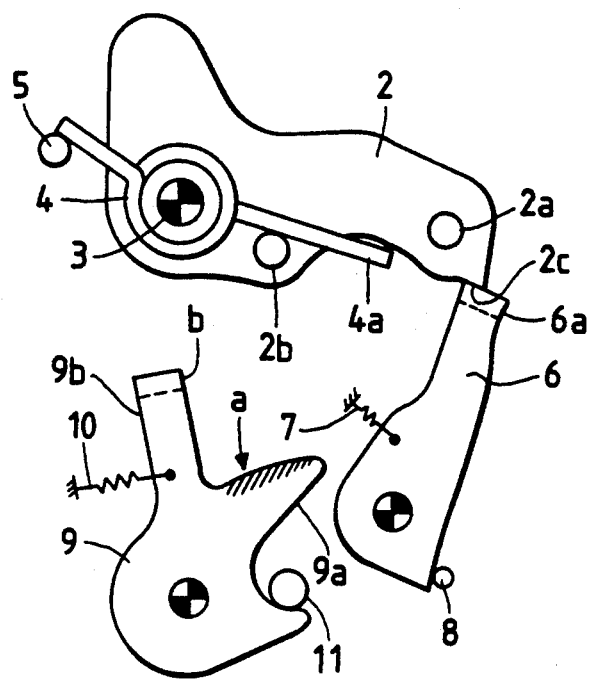
FIG. 2 is a partial plan view, traced on a larger scale, illustrating the braking means set in the state shown in FIG. 1.
Figure 3:
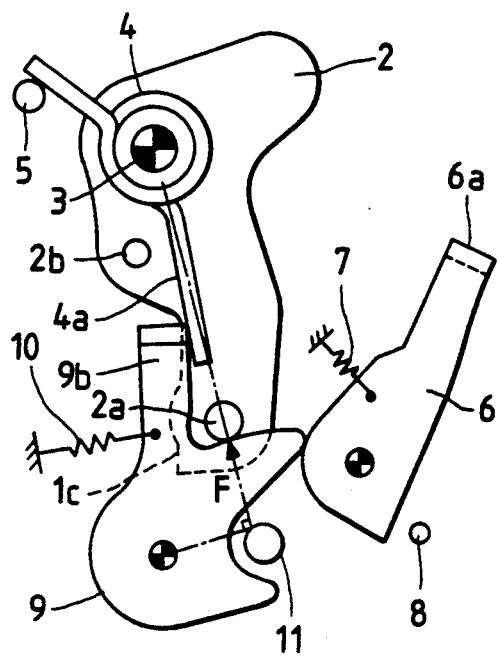
FIG. 3 is a plan view, traced on a larger scale, illustrating the braking means in a state where the braking means is actuated.

Now, description will be made below of the braking function for the front blade actuating lever 2 at the stage for opening the exposure aperture 1a with reference to FIG. 2 and FIG. 3. When the clockwise rotation of the front blade supporting lever 12 allows the upper edge of the front blade for forming slit 13a to travel over the lower edge of the exposure aperture 1a as described above, the actuating pin 2a is brought into contact with the cam surface a of the first arm 9a of the brake lever 9 and pushes this cam surface, thereby rotating the brake lever 9 clockwise against resilience $F_1$ of the spring 10. In this case, positional relationship between the actuating lever 2 and the brake lever 9 is selected so that the resilience $F_1$ of the spring 10 is exerted to the actuating lever 2 by way of the actuating pin 2a in the direction toward the shaft 3. When the actuating lever 2 is rotated further clockwise, the brake lever 9 is rotated further clockwise and the bent end b of the second arm 9b is brought into contact with the arm 4a of the actuating spring 4, thereby blocking the clockwise rotation of the arm 4a. Accordingly, the arm 4a is detached from the pin 2b as shown in FIG. 3. Accordingly, the actuating lever 2 is freed and is set in a condition where it is rotating clockwise only under its inertia. In this condition, larger resilience $F_2$ of the actuating spring 4 is exerted to the brake lever 9 by way of the second arm 9b. Consequently, a total resilience $F$ ($=F_1+F_2$) is exerted to the actuating pin 2a by way of the cam surface a in this condition, whereby the actuating lever 2 is strongly pressed against the shaft 3 in one direction (the direction indicated by an arrow F). This pressing produces a strong frictional force between the outer circumferential surface of the shaft 3 and the inner circumferential surface of the hole in which the actuating lever 2 is slidably fitted, thereby promptly stopping, without rebounds, the front blade actuating lever 2, the front blade supporting lever 12, and the front blades 13a, 13b, 13c which are rotating under inertia. Therefore, the braking means according to the present invention makes it possible to perform the exposure of film with high accuracy since the braking means does not allow the upper edge of the front blade for forming slit 13a to appear again within the exposure aperture 1a due to rebound after the front blade 13a has traveled over the lower edge of the exposure aperture 1a.

Also at the stage of the downward rotation of the rear blades 17a, 17b, 17c, the brake lever 9' exerts the braking force thereof to the rear blade actuating lever 14, the rear blade supporting lever 16 and the rear blade group in a manner quite similar to that described above, and the braking means according to the present invention makes it possible to terminate the exposure of film since the braking means does not allow the lower edge of the rear blade for forming slit 17a to appear again within the exposure aperture 1a after the rear blade 17a has traveled over the lower edge of the exposure aperture 1a for terminating the exposure of film.

The shutter is cocked with a setting member (not shown) which is interlocked with a film winding mechanism when the front blade actuating lever 2 and the rear blade actuating lever 14 are rotated counterclockwise simultaneously to the positions illustrated in FIG. 1. The cocked condition of the shutter is maintained by locking the front blade actuating lever 2 and the rear blade actuating lever 14 with the lock levers 6 and 6' respectively.

What is claimed is:

1. A focal plane shutter for cameras comprising:
 a shutter base plate having an exposure aperture formed therein;
 a front blade actuating member pivoted on said base plate and capable of rotating front blades, for exposure of a film, from cocked positions for opening said exposure aperture to uncocked positions for closing said exposure aperture;
 a rear blade actuating member pivoted on said base plate and capable of rotating rear blades from cocked positions for opening said exposure aperture for exposure of the film to uncocked position for closing said exposure aperture;
 a front blade actuating power source detachably connected to said front blade actuating member and functioning to urge said front blade actuating member to rotate said member from a cocked position to an uncocked position;
 a rear blade actuating power source detachably connected to said rear blade actuating member and functioning to urge said rear blade actuating member to rotate said actuating member from a cocked position to an uncocked position;
 a front blade braking member pivoted on said base plate, and having a first arm to be brought into contact with said front blade actuating member and pushed thereby when the front blade actuating member is rotated from the cocked position to the uncocked position, and a second arm to be engaged with said front blade actuating power source for disconnecting said front blade actuating power source from said front blade actuating member at a final stage of a rotational motion of said front blade braking member; and
 a rear blade braking member pivoted on said base plate, and having a third arm to be brought into contact with said rear blade actuating member and pushed thereby, and a fourth arm to be engaged with said rear blade actuating power source for disconnecting said rear blade actuating power source from said rear blade actuating member at a final stage of a rotational motion of said rear blade braking member;
 wherein a force produced by said front blade actuating power source is exerted toward a pivot of said front blade actuating member by way of said front blade braking member when said front blade actuating power source is disconnected from said front blade actuating member by said second arm, and a force produced by said rear blade actuating power source is exerted toward a pivot of said rear blade actuating member by way of said rear blade braking member when said rear blade actuating power source is disconnected from said rear blade actuating member by said fourth arm.

2. A focal plane shutter according to claim 1 wherein said front blade actuating power source is a coil spring wound around the pivot of said front blade actuating member, and has an end fixed to said shutter base plate and the other end detachably connected to said front blade actuating member; and said rear blade actuating power source is a coil spring wound around the pivot of said rear blade actuating member, and has an end fixed to said shutter base plate and the other end detachably connected to said rear blade actuating member.

3. A focal plane shutter according to claim 1 further comprising a first biasing means connected to said front blade braking member for urging this member and a second biasing means connected to said rear blade braking member for urging this member;
 wherein resilience of said first biasing means is exerted in a direction toward the pivot of said front blade actuating member by way of this front blade actuating member when said first arm is pushed by said front blade actuating member and resilience of said second biasing means is exerted in a direction toward the pivot of said rear blade actuating member by way of said rear blade actuating member when said third arm is pushed by said rear blade actuating member.

* * * * *